(12) United States Patent
Jaffe

(10) Patent No.: US 9,080,291 B2
(45) Date of Patent: Jul. 14, 2015

(54) EMBEDDED RECEIVER FOR FASTENERS

(76) Inventor: Jonathan E. Jaffe, Gallatin, TN (US)

( * ) Notice: Subject to any disclaimer, the term of this patent is extended or adjusted under 35 U.S.C. 154(b) by 251 days.

(21) Appl. No.: 13/425,632

(22) Filed: Mar. 21, 2012

(65) Prior Publication Data

US 2013/0004705 A1   Jan. 3, 2013

Related U.S. Application Data

(60) Provisional application No. 61/503,952, filed on Jul. 1, 2011.

(51) Int. Cl.
*B32B 3/24*       (2006.01)
*B32B 21/04*      (2006.01)
*F16B 21/00*      (2006.01)
*F16B 39/00*      (2006.01)
*E01B 3/00*       (2006.01)
(Continued)

(52) U.S. Cl.
CPC . *E01B 3/46* (2013.01); *B32B 3/266* (2013.01); *E01B 3/10* (2013.01); *E01B 9/12* (2013.01); *E04C 2/46* (2013.01); *F16B 5/02* (2013.01); *F16B 15/06* (2013.01); *F16B 21/10* (2013.01); *F16B 39/22* (2013.01); *B32B 21/04* (2013.01); *B32B 2260/00* (2013.01); *B32B 2260/026* (2013.01); *B32B 2419/00* (2013.01); *E01B 9/06* (2013.01); *E04C 2/00* (2013.01); *E04C 2/06* (2013.01); *F16B 15/00* (2013.01); *F16B 21/20* (2013.01); *F16B 25/0031* (2013.01); *F16B 39/24* (2013.01); *Y10T 428/24132* (2015.01); *Y10T 428/24273* (2015.01); *Y10T 428/249923* (2015.04); *Y10T 428/31504* (2015.04); *Y10T 428/31989* (2015.04); *Y10T 428/8305* (2015.04)

(58) Field of Classification Search
CPC .... F16B 21/20; F16B 15/0023; F16B 39/101; F16B 21/10; E01B 11/38; E01B 9/12; E01B 9/38; E01B 9/64; E01B 9/683; E01B 3/44; E01B 3/46; E01B 3/10; E01B 9/06; B04B 2001/386; E04F 11/1804; E04B 1/7637
USPC ........ 411/94, 96, 451.1, 2, 190, 84, 511, 358; 238/313, 85, 93, 366, 370
See application file for complete search history.

(56) References Cited

U.S. PATENT DOCUMENTS 370,164 A      9/1887  Stillman
417,283 A  *  12/1889  Reed ............................. 238/178
(Continued)

FOREIGN PATENT DOCUMENTS

EP   0440597 A1   8/1991
GB   2030200 A    4/1980
(Continued)

*Primary Examiner* — Jeff Vonch
(74) *Attorney, Agent, or Firm* — Cook Alex Ltd.

(57) ABSTRACT

A receiver plate for embedding within a fastener target area of a fabricated body is disclosed, with the receiver plate providing tri-axial motion resistance for a fastener that may be inserted into the fabricated body and through the receiver plate at an imprecisely determined location within the fastener target area. Also disclosed is a fabricated body adapted for insertion of fasteners within a target area comprising a molded body portion, and a receiver plate embedded within the molded body portion in a target area. Further disclosed is a fastener and receiver plate for use with a body in which the receiver plate is embedded, wherein the fastener has a head, a shaft and a tapered tip.

24 Claims, 8 Drawing Sheets

(51) Int. Cl.

| | | |
|---|---|---|
| *E01B 9/00* | (2006.01) | |
| *E01B 9/12* | (2006.01) | |
| *E04C 2/00* | (2006.01) | |
| *E01B 3/46* | (2006.01) | |
| *F16B 21/10* | (2006.01) | |
| *F16B 39/22* | (2006.01) | |
| *E04B 2/00* | (2006.01) | |
| *B32B 3/26* | (2006.01) | |
| *F16B 5/02* | (2006.01) | |
| *F16B 15/06* | (2006.01) | |
| *E01B 3/10* | (2006.01) | |
| *E04C 2/06* | (2006.01) | |
| *F16B 21/20* | (2006.01) | |
| *F16B 39/24* | (2006.01) | |
| *F16B 15/00* | (2006.01) | |
| *F16B 25/00* | (2006.01) | |
| *E01B 9/06* | (2006.01) | |

(56) References Cited

U.S. PATENT DOCUMENTS

| | | | |
|---|---|---|---|
| 635,846 A | 10/1899 | Dice | |
| 756,815 A * | 4/1904 | Beezer | 238/83 |
| 911,979 A * | 2/1909 | Heath | 238/37 |
| 1,118,431 A | 11/1914 | McKently | |
| 1,122,373 A * | 12/1914 | Dutcher | 238/295 |
| 1,141,428 A * | 6/1915 | Simpson | 238/295 |
| 1,320,085 A | 10/1919 | Myers | |
| 1,351,819 A * | 9/1920 | Whitcomb | 238/265 |
| 1,425,199 A | 8/1922 | Hartley | |
| 1,439,954 A * | 12/1922 | Emerson | 428/140 |
| 1,485,202 A | 2/1924 | Rosenberg | |
| 1,522,209 A * | 1/1925 | Ruse | 238/91 |
| 1,555,555 A * | 9/1925 | Comerma | 428/124 |
| 1,582,721 A * | 4/1926 | Adams | 52/417 |
| 1,685,254 A * | 9/1928 | Walper | 52/363 |
| 1,738,832 A * | 12/1929 | Kean | 52/675 |
| 1,787,163 A * | 12/1930 | New | 428/70 |
| 1,855,329 A | 4/1932 | Wagner | |
| 1,972,119 A | 9/1934 | Wernhardt | |
| 2,242,834 A * | 5/1941 | Price | 52/344 |
| 2,264,489 A * | 12/1941 | Tiegler et al. | 248/694 |
| 2,319,058 A | 5/1943 | Hansman | |
| 2,389,261 A * | 11/1945 | Lang | 411/437 |
| 2,564,643 A | 8/1951 | Hall | |
| 2,567,935 A | 9/1951 | Hallock | |
| 2,869,792 A | 1/1959 | Hodel | |
| 3,289,940 A * | 12/1966 | Groff | 238/29 |
| 3,293,725 A * | 12/1966 | Gunter et al. | 29/6.1 |
| 3,367,576 A | 2/1968 | Suermann | |
| 3,511,127 A | 5/1970 | Gisondi | |
| 3,545,152 A * | 12/1970 | Knohl | 52/367 |
| 3,882,755 A | 5/1975 | Enstrom | |
| 3,922,828 A * | 12/1975 | Patton | 52/368 |
| 3,939,617 A | 2/1976 | Eisses | |
| 3,964,680 A | 6/1976 | Arthur | |
| 3,974,603 A | 8/1976 | Vandegriff | |
| 3,983,779 A | 10/1976 | Dimas | |
| 4,068,366 A * | 1/1978 | Hillesheim | 29/527.4 |
| 4,083,491 A | 4/1978 | Hill | |
| 4,105,159 A | 8/1978 | Brown | |
| 4,108,377 A | 8/1978 | Potter | |
| 4,134,546 A | 1/1979 | Dankert | |
| 4,202,494 A | 5/1980 | Rumell | |
| 4,203,193 A | 5/1980 | Arthur | |
| 4,204,660 A | 5/1980 | Feuillade | |
| 4,236,670 A | 12/1980 | Limmergard et al. | |
| 4,416,419 A | 11/1983 | Ohno | |
| 4,461,422 A | 7/1984 | Harkus | |
| 4,634,049 A | 1/1987 | Steinfeld et al. | |
| 4,652,495 A | 3/1987 | Sato et al. | |
| 4,714,195 A | 12/1987 | Creutz et al. | |
| 4,928,878 A | 5/1990 | Young | |
| 4,943,253 A | 7/1990 | Smith | |
| 4,978,065 A | 12/1990 | Deuchemin | |
| 5,046,907 A | 9/1991 | von Lange et al. | |
| 5,055,350 A | 10/1991 | Neefe | |
| 5,160,085 A | 11/1992 | Arnold et al. | |
| 5,170,937 A | 12/1992 | Vanotti | |
| 5,314,115 A | 5/1994 | Moucessian | |
| 5,584,153 A * | 12/1996 | Nunley et al. | 52/410 |
| 5,609,295 A | 3/1997 | Richards | |
| 5,722,589 A | 3/1998 | Richards | |
| 5,758,821 A | 6/1998 | Wirthwein et al. | |
| 5,799,870 A | 9/1998 | Bayer | |
| 5,886,078 A | 3/1999 | Sullivan et al. | |
| 5,916,932 A | 6/1999 | Nosker et al. | |
| 6,021,958 A | 2/2000 | Smith | |
| 6,059,199 A | 5/2000 | Eriksson et al. | |
| 6,070,806 A | 6/2000 | Barbakadze et al. | |
| 6,191,228 B1 | 2/2001 | Nosker et al. | |
| 6,247,651 B1 | 6/2001 | Marinelli | |
| 6,336,265 B1 | 1/2002 | Niedermair | |
| 6,471,140 B2 | 10/2002 | Barry et al. | |
| 6,481,170 B1 * | 11/2002 | Savenok et al. | 52/288.1 |
| 6,532,787 B2 * | 3/2003 | Suitts | 72/185 |
| 6,601,361 B2 * | 8/2003 | Seibert | 52/698 |
| 6,659,362 B1 * | 12/2003 | Hallissy et al. | 238/83 |
| 6,708,896 B2 | 3/2004 | Robinson | |
| 6,766,963 B2 | 7/2004 | Hansen | |
| 6,805,525 B2 | 10/2004 | Oswald | |
| 6,828,372 B2 | 12/2004 | Sullivan et al. | |
| 6,905,299 B2 | 6/2005 | Moores, Jr. | |
| 7,011,253 B2 | 3/2006 | Nosker et al. | |
| 7,033,122 B2 | 4/2006 | Farrell et al. | |
| 7,097,405 B2 | 8/2006 | O'Banion et al. | |
| 7,147,169 B2 | 12/2006 | Walsh | |
| 7,156,319 B2 | 1/2007 | Kowalski | |
| 7,395,925 B2 | 7/2008 | Sutt, Jr. | |
| 7,866,569 B2 | 1/2011 | Cadwell | |
| 2002/0062545 A1 | 5/2002 | Niedermair | |
| 2002/0071741 A1 | 6/2002 | Oswald | |
| 2003/0029121 A1 * | 2/2003 | Nickel | 52/698 |
| 2005/0017086 A1 | 1/2005 | Barry | |
| 2005/0106406 A1 | 5/2005 | Curtis et al. | |
| 2006/0180046 A1 * | 8/2006 | Barmakian et al. | 104/124 |
| 2007/0040293 A1 * | 2/2007 | Lane et al. | 264/46.4 |
| 2007/0187522 A1 | 8/2007 | Kirchmer et al. | |
| 2008/0035747 A1 | 2/2008 | Yuan | |
| 2008/0179418 A1 | 7/2008 | Brough et al. | |
| 2009/0038250 A1 * | 2/2009 | Frenkil | 52/447 |
| 2009/0277100 A1 * | 11/2009 | Rottiers et al. | 52/28 |
| 2010/0084787 A1 | 4/2010 | Brough et al. | |

FOREIGN PATENT DOCUMENTS

| | | | |
|---|---|---|---|
| GB | 2087320 A | 5/1982 | |
| JP | 53109312 A * | 9/1978 | E01B 3/44 |
| JP | 11293601 A * | 10/1999 | E01B 3/00 |
| WO | WO 97/20108 | 6/1997 | |
| WO | WO 2007/009362 A1 | 1/2007 | |

* cited by examiner

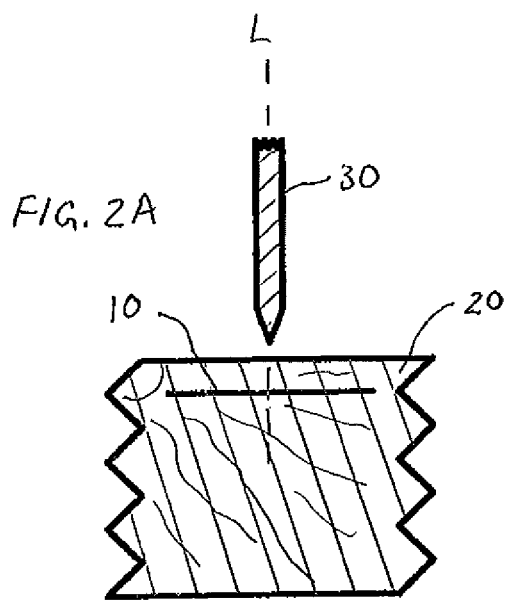
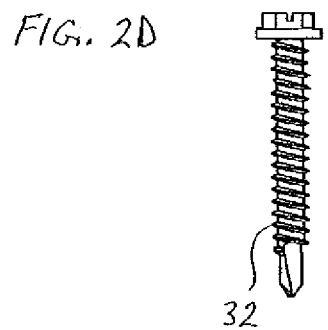
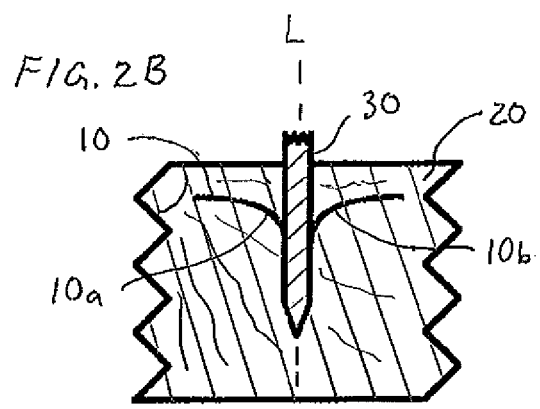
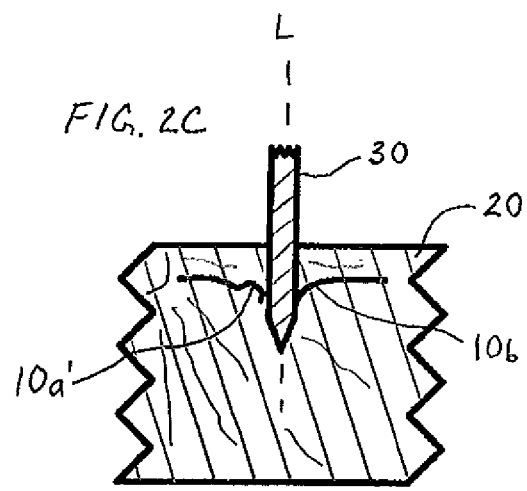

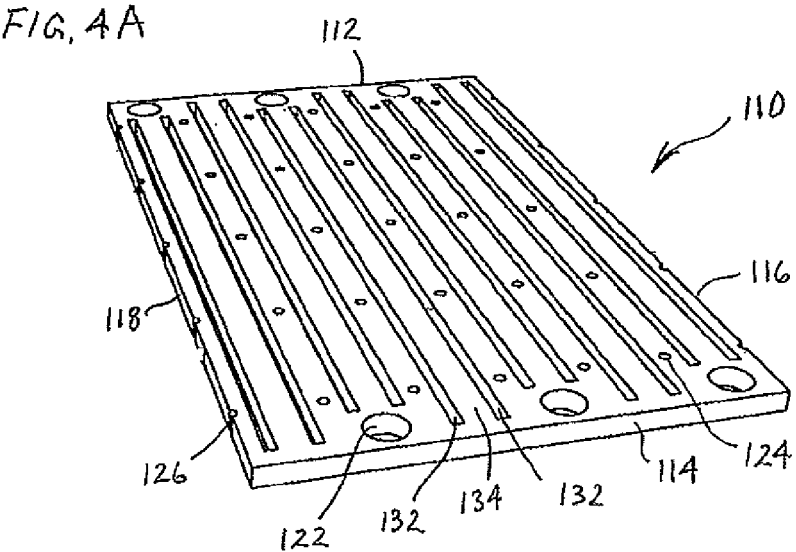
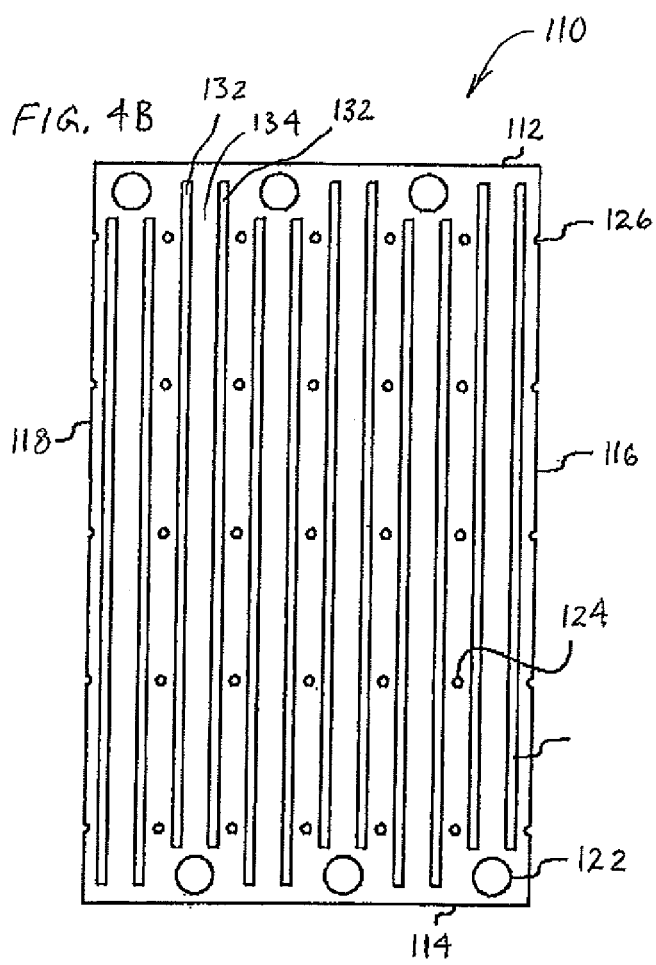

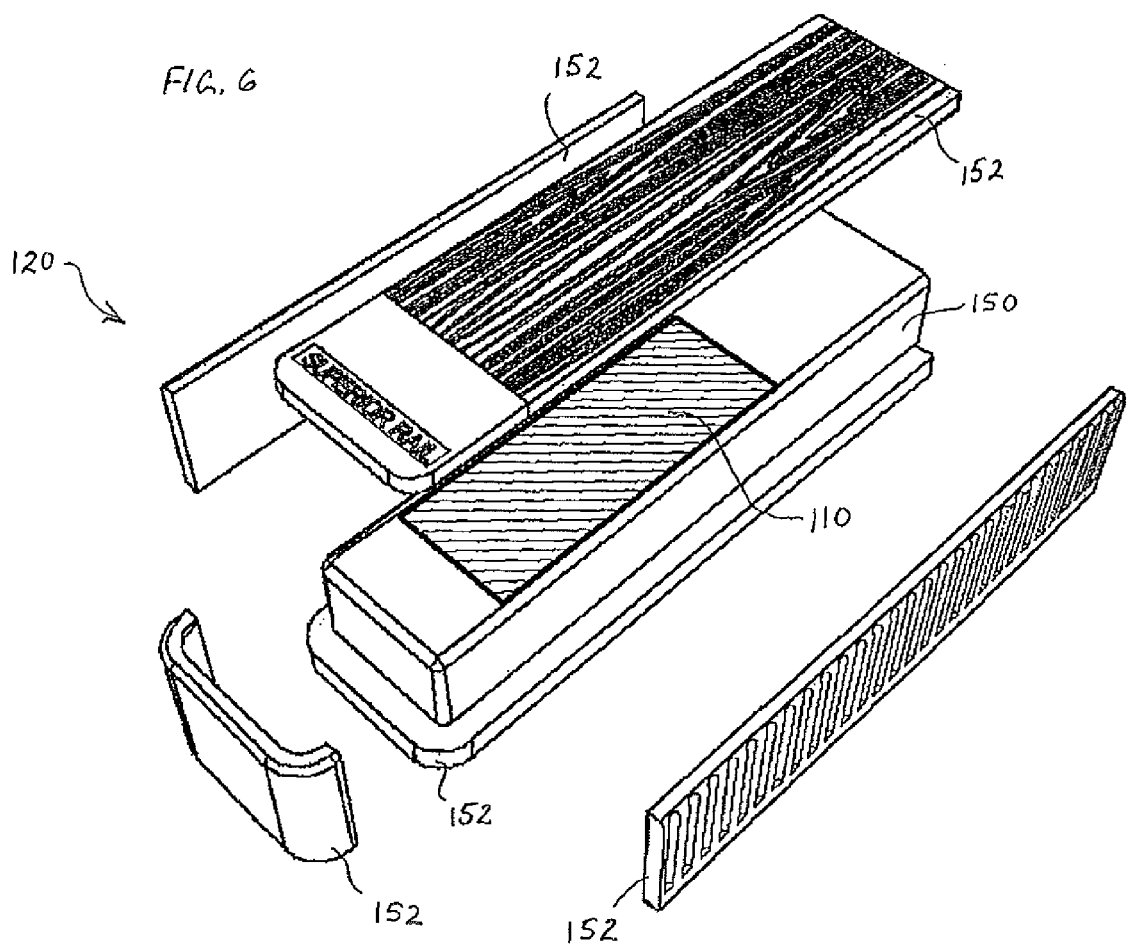

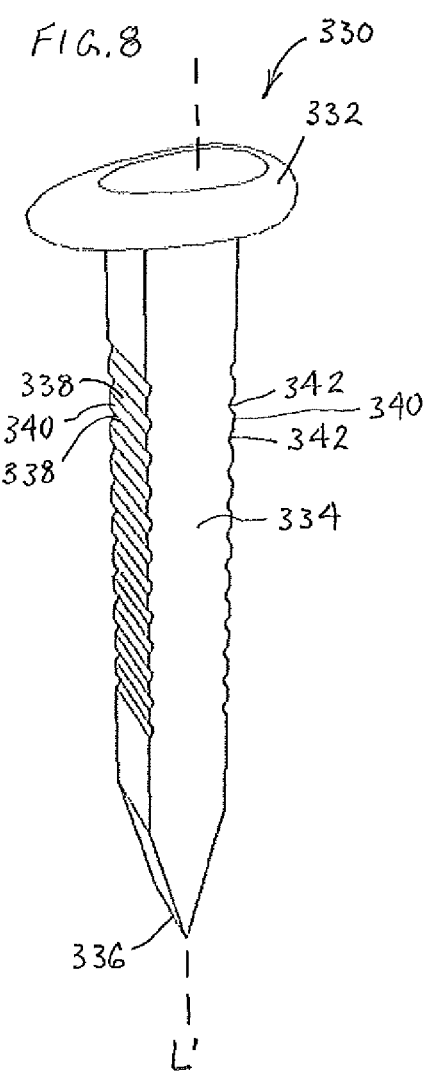
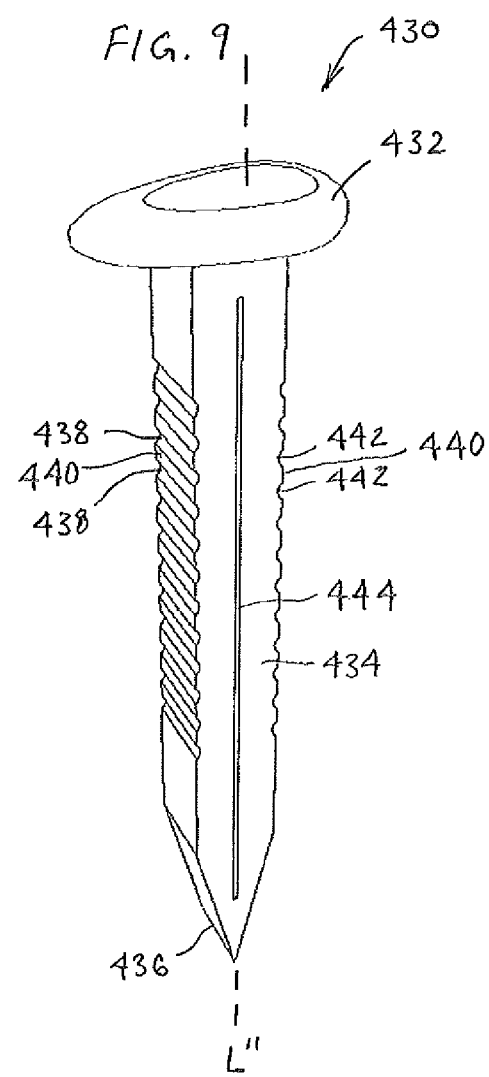

EMBEDDED RECEIVER FOR FASTENERS

CROSS-REFERENCE TO RELATED APPLICATION

This application is a continuation-in-part of and claims the benefit of U.S. Provisional Patent Application No. 61/503,952 which was filed Jul. 1, 2011, the disclosure of which is hereby incorporated by reference in its entirety.

BACKGROUND

1. Field of the Invention

This disclosure relates to fasteners for connecting objects to bodies, and more particularly to an embedded receiver for fasteners.

2. Discussion of the Prior Art

Fasteners come in many shapes and sizes. Most fasteners generally serve to connect two or more objects. Nails, which is a common name for small spikes, and other spike-type fasteners, have been around for centuries. Unlike receivers for threaded fasteners, such as wing nuts, speed nuts, T-nuts, hex nuts, etc., spike-type fasteners do not have equivalent individual receivers. Instead, the receiver function for a spike-type fastener generally is provided by the material into which the fastener is driven. For example, most commonly nails are received by timbers.

Machines to make "cut" nails produced "square nails", as their cross-section was square, or nearly so, due to the stock from which these nails were cut. Square nails later gave way to tapered nails. Still later, machines provided for increased production, lower cost, greater standardization, and wide spread adoption of manufacturing of nails. In turn, cutting machines gave way to processing wire of a uniform thickness into "wire nails", having a cylindrical shaft, which again lowered costs.

Within the rail industry, spikes with chisel tips have been used in securing rails to crossties, which are sometimes called "sleepers". Such spikes also are called "cut spikes" to differentiate them from spikes with threads. Cut spikes also are called "crampons", which more commonly are used in rock climbing. Rail spikes are essentially large nails with flat, or tapered sides, an oversized, offset head and a chisel-shaped, flat-edged tip.

Modern threaded fasteners are based on a design principle that was first thought to be used as a conveyor that moved material internal to a twisted thread as it was rotated. Standardized systems of screw threads, as well as nuts, have been developed. There are two general types of threaded fasteners, namely, the screw and the bolt. The screw generally is a single piece with two distinct sections, a head and a shaft. The shaft may be fully, or partially threaded. For general purpose screws, the end of the thread typically is pointed and the threaded shaft is either straight, slightly tapered or a combination of the two. Some screws that are tapered are self-tapping, or otherwise referred to as self-threading.

There are many configurations for screw heads, such as Bugle, Countersunk, Button, Fillister, Flat Head, Oval (sometimes called raised head), Pan, Round, or Truss Head. There also are many configurations by which to drive or force rotation of screws, such as Hex, Hex Socket (also called Allen head), One-Way Security, Phillips Head, Robertson (also called square drive or square socket head), Spline Drive, Straight Slotted, Torx Drive, or Security Torx. Quite simply, when a screw is rotated in one direction, the threads move the screw deeper into the material to which it is being fastened, and if rotated in the opposite direction the screw backs out of the material.

By comparison, a bolt has a head and a threaded rod or shaft, but essentially has no taper to the shaft, and a flat end. Rotating the head, rotates the threaded shaft which moves the shaft through a specific matching receiver, which often is called a "nut". The free space between the head of a bolt and the face of the matching nut is reduced as the threaded shaft or the nut is tightened, thereby providing a clamping load. Sometimes the head and threaded shaft remain in place while the nut is tightened, or the nut may be held in place while the bolt head and accompanying shaft are rotated. There are many configurations for bolt heads including, for example, Hex, Rounded, and Slotted.

The major difference between screws and bolts are the minimum number of parts necessary to provide secure connection. For a screw, generally only one part is necessary as the material receiving the screw provides the resistance to extraction, as the screw threads bear on the material. For a bolt, two parts are necessary, the bolt and the receiver, the latter being most commonly in the form of a hexagonal-shaped nut. Some fasteners are referred to as a screw, but are configured for use with a receiver, and are more properly a form of bolt. For instance, Machine Screws are twisted into a receiver such as a nut, the end of the screw is generally flat, and the shaft is not tapered.

The term "receiver" is being used herein with respect to the prior art as a generic name for a second part of a fastener. For threaded fasteners, the receiver generally is free to move, in the sense that the receiver is not attached to anything else. Receivers that are referred to as a nut can be in various configurations, such as a Cap, Hex, Square, or Wing Nut. There also may be a captive nut, such as a T-Nut, which is embedded at the surface of an object and typically includes an elongated, threaded cylinder that reaches through a portion of the object.

With few exceptions spikes are generally received by the material into which they are driven and do not have a separate receiver component. Most commonly, spikes and nails are received by wood. Only the material receiving a spike-type fastener provides resistance to lateral motion and extraction. This is a problem well known to anyone who has hung a very heavy picture on a simple nail that was driven into gypsum-based wallboard. The nail will tend to crush the material downward as an excessive load is applied to the shaft, near the head of the nail. This can result in an enlarged hole in the wallboard, significantly compromising the resistance to extraction of the fastener.

Forces acting on prior art spike-type fasteners, whether in the longitudinal direction of extraction or within a plane perpendicular thereto, can act to loosen such fasteners, rendering them less effective. The present disclosure seeks to overcome disadvantages within the prior art to provide more affective fastener retention and without requiring a specific location for the fastener.

SUMMARY

The present disclosure relates to fasteners for connecting objects to fabricated bodies, and more particularly presents an embedded receiver plate that provides tri-axial motion resistance for a fastener, wherein the fastener may be inserted at an imprecisely determined location within a fastener target area. One or more receiver plates may be embedded in a fabricated body for further resistance to lateral motion and extraction forces. The embedded receiver may be used with spike-type fasteners and optionally may be used with self-tapping type screws.

It is to be understood that both the foregoing general description and the following detailed description are exemplary and provided for purposes of explanation only, and are not restrictive of the subject matter claimed. Further features and objects of the present disclosure will become more fully apparent in the following description of example embodiments and from the appended claims

BRIEF DESCRIPTION OF THE DRAWINGS

In describing the preferred examples, reference is made to the accompanying drawing figures wherein like parts have like reference numerals, the term "receiver" is used generally to indicate a structure embedded within a fabricated body and adapted to accept an inserted fastener, and wherein:

FIG. 2A is a partial cross-sectional view showing a receiver plate within a body and a fastener positioned prior to being driven into the body.

FIG. 2B is a partial cross-sectional view showing the receiver plate within the body and the fastener shown in FIG. 2A, but after the fastener has been driven into the body and through the plate, with bending deformation of the plate.

FIG. 2C is a partial cross-sectional view showing partial buckling of the plate shown in FIG. 2B.

FIG. 2D is a side view of a fastener in the form of a self-tapping screw for use with a receiver that may be embedded within a body.

FIG. 4A is a perspective view of a particular plate configuration.

FIG. 4B is a plan view of the plate shown in FIG. 4A.

FIG. 6 is a perspective view showing the location of a plate within a fabricated body in the form of a railroad tie.

FIG. 8 is a perspective view of an example fastener in the form of a railroad tie spike having sides with lateral grooves.

FIG. 9 is a perspective view of a further example fastener in the form of a railroad tie spike having sides with lateral grooves, as well as further sides having a longitudinal groove.

It should be understood that the drawings are not to scale. While some mechanical details of embedded receivers and fasteners, such as further section views have been omitted, such details are considered within the comprehension of those skilled in the art in light of the present disclosure. It also should be understood that the present disclosure is not limited to the examples illustrated.

DETAILED DESCRIPTION OF THE INVENTION

Referring generally to FIGS. 1A-9, it will be appreciated that a receiver, in the form of a plate which is to be embedded in a fabricated body into which a fastener will be inserted, may be constructed of various materials and in various configurations. Indeed, given that a receiver in the form of a plate may provide friction and resistance to extraction in the longitudinal direction of a fastener, as well as providing resistance to motion within a two dimensional plane of the receiver, which is perpendicular to the shaft of the fastener, many types of materials could be used, and the dimensions and configurations of the receiver may be determined based on desired performance characteristics.

This disclosure includes a receiver, in a form that generally will be referred to as a plate or a receiver plate, regardless of the thickness of the receiver, which in many cases will be quite thin. The receiver plate is to be embedded within a fabricated body to which something may be connected. The receiver also may be used with spike-type fasteners, and does not require specific placement within the fabricated body. Nor does the receiver include a preformed, matching bore of a precise diameter that is intended to receive the fastener. In addition, one or more receiver plates may be used, preferably in spaced apart configurations. Also, configurations of the receiver plate may be used with non spike-type fasteners that include piercing and threading capabilities, such as self-tapping screws. Such fasteners can pierce the plate, engage the threads of the screw with the plate and be advanced by rotation of the screw. Use of such threaded fasteners also permits clean removal by reversing the rotation of the fastener.

Figure 1A:
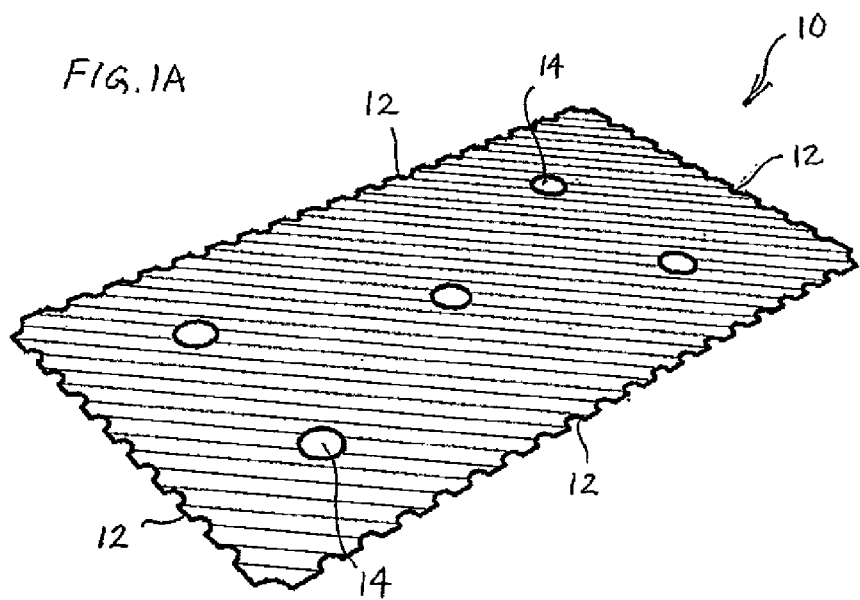
FIG. 1A is a perspective view of a receiver in the form of a plate.

FIG. 1A shows an example plate 10 that would be suitable for use with both spike-type and non spike-type fasteners. A plate of this type may be embedded within relatively thin materials, such as a section of wallboard, which when made with gypsum between paper faces, is more commonly referred to as drywall. However, it will be appreciated that wallboard may be constructed in other forms and of other materials as well. A plate for use in a section of wallboard also may include scalloped sides 12 and apertures 14 or other passages through the plate, to provide a strong mechanical bond between the material that is within the wallboard, or other material, that will surround the embedded plate.

Figure 1B:
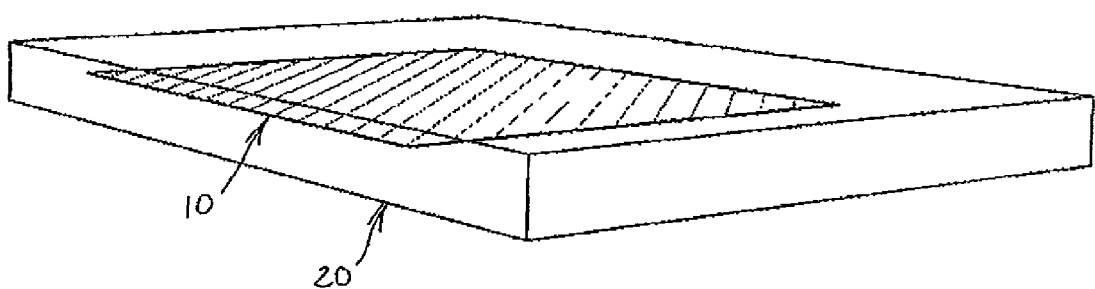
FIG. 1B is a simplified perspective view of a receiver embedded within a body.

FIG. 1B is a simplified view showing the general location of a receiver, which may be in the form of the plate 10 of FIG. 1A, when embedded in a body 20 of wallboard, such as a section of drywall. A section of wallboard may be less than or equal in size to what is commonly referred to as a sheet, where for example, sheets of drywall are commercially offered in a variety of sizes, including but not limited to 4 ft×8 ft×⅝". The plate 10 would be generally thin, in absolute thickness, such as in the form of sheet metal or a thick metal foil. Nevertheless, the ratio of the plate thickness to the intended fastener diameter may be similar to that which would be suitable for a plate that would be used in a much thicker body, such as a fabricated railroad tie.

When used in a section of wallboard, the plate 10 would have nominal top, bottom and side edges 12 and could provide a wall section with a non-location specific, built-in, receiver that would be useful in mountings, such as for picture hanging. Only the general location of the plate would be required to be known, in contrast with having to know the more precise location of wall studs or similar structures. Engaging the embedded plate with a spike-type fastener or a self-tapping screw, such as in the form of a sheet metal type screw, would provide the fastener with resistance to motion in three directions. Thus, the plate enhances the resistance to extraction in the longitudinal direction of the shaft of the fastener, as well as providing resistance to motion within a two dimensional plane of the plate, which is perpendicular to the shaft of the fastener.

Referring now to the simplified cross-sectional views in FIGS. 2A-2C, applying a force to a spike-type fastener 30 in a direction perpendicular to the surface of the body 20 and the plate 10 therein will drive the fastener 30 through the material of the body 20, then through the plate 10, and finally into or all the way through the remaining material of the body 20 that is located on the opposite side of the plate 10. For convenience, the body 20 is shown in FIGS. 2A-2C as a timber or piece of wood. However, it will be appreciated that, as previously mentioned, the body may be composed of many different materials, and need not be composed of a single type of material, but rather can have layers or other configurations that may include, for example, an outer cover of a different material. In this example, the plate 10 deforms as some of the plate material is moved by the fastener 30 into the material in which the fastener is embedded. The plate 10 will provide some additional resistance to insertion, but this can be controlled by appropriate selection of plate material and thickness.

The material of the body 20 that is displaced during insertion of a fastener 30 and the deformation of the plate 10 can yield two modes of increased resistance to extraction, non-buckling and buckling. In FIG. 2A, the spike-type fastener 30 has not yet been driven into a section of the body 20. The tip of the fastener 30 is perpendicular to the longitudinal axis L of the body 20, and to the plane of the plate 10 embedded within the body 20. In FIG. 2B, the fastener 30 has been driven into the body 20 and through the plate 10, rupturing forward the material of the plate 30, forming arc shapes 10a, 10b in the plate 10 to the left and right of the fastener 30.

In the initial phase of extraction, the displaced material of the plate 10 will attempt to remain in the same arc shape to which it was deformed during insertion of a spike-type fastener 30. Thus, if a spike-type fastener 30 is driven into the body 20 and the material of the plate 10 is deformed into arc shapes 10a, 10b, then if the arcs 10a, 10b are maintained, the spike should remain in friction-generating contact with the displaced material as that material provides additional resistance to extraction. This is non-buckling resistance.

If, when subjected to an extraction force, the displaced material of the arc 10a of the plate 10 bends or folds in such a way as to remove the displaced plate material from interfering with extraction of the fastener 30, then the friction that would otherwise serve to resist extraction is reduced. In FIG. 2C, the bending, folding or buckling of the displaced material on the left is shown, for example, in the segment 10a' of the plate 10. In contrast, the arc 10b to the right has not buckled.

FIG. 2D provides an example fastener 32 in the form of a self-tapping screw that may alternatively be used in installations where it would be advantageous to be able to threadably advance a fastener into the material of a body 20 and one or more plates 10, and/or to have the option of being able to later reverse the rotation and cleanly remove the fastener 32. As previously noted, it will be appreciated that fasteners, whether of a spike-type or self-tapping screw type configuration, may have a variety of constructions that would be suitable for use with receivers in accordance with the present disclosure.

Figure 3A:
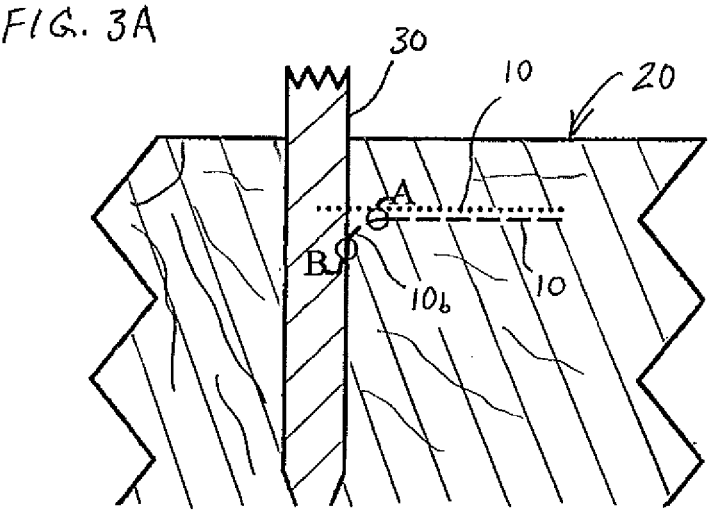
FIG. 3A is a partial cross-sectional view showing further detail relating to plate deformation upon insertion of a fastener.
Figure 3B:
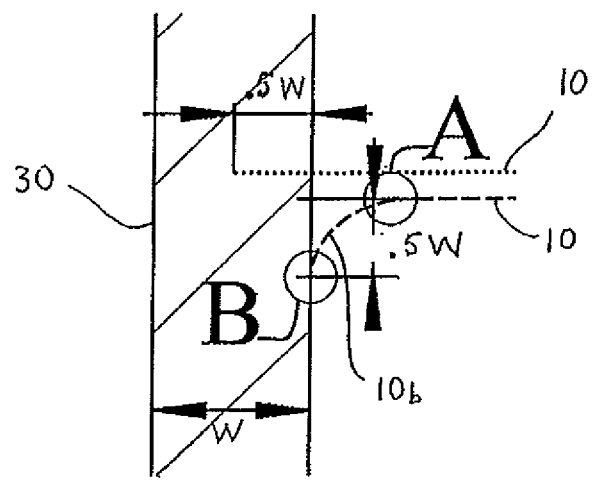
FIG. 3B is a closer view of the plate deformation shown in FIG. 3A.

FIGS. 3A and 3B provide simplified cross-sectional views with further detail regarding the deformation of the plate 10 when a spike-type fastener 30 is driven into a fabricated body 20 in which the plate 10 has been embedded. As with FIGS. 2A-2C, for convenience, FIG. 3A is shown as a timber or piece of wood, with the understanding that the body 20 could be constructed of many different types of materials and in different combinations and/or configurations. For demonstration purposes, in FIG. 3A, the dotted line represents a side view of a portion of the plate 10, as it would have extended halfway through the area where the fastener 30 is now driven into the body 20. The vertical location of the dotted line is not necessarily where the plate 10 would be placed, but is generalized to show the relatively planar shape prior to deformation of the plate 10.

The dashed line represents the same portion of the plate 10 after insertion of the fastener 30. It includes a deformed section 10b and a non-deformed section 10. The views of the circled locations are provided with reference to Point A, at the beginning of deformation, and Point B at the end of the deformed section 10b. Point A occurs somewhere within Circle A and continues to be attached to the remainder of the plate 10. Point B occurs somewhere within the Circle B and is at the broken end of the deformed section 10b.

FIG. 3B presents the images in a relatively large format because the actual dimensions of the items, such as the thickness of the plate 10, would be quite small. Thus, in the enlarged view in FIG. 3B, the example fastener 30 has a width W, and the section 10b extends one half of the width of the fastener 30, or 0.5 W. As discussed above, there are two extremes for deformation, arc shape or bending to an extent of buckling.

For arc-type deformation, the Circle A contains Point A which is where the flat portion of the plate portion 10b is connected to the remainder of the plate 10. The portion of the plate 10b curves generally downward to an end at Point B within the Circle B. If the deformation elongates the broken section, then the vertical distance between Point A and Point B could be more than the 0.5 W shown. For more perpendicular bent-type deformation, Point A would be immediately adjacent to the side of the fastener 30 and immediately above Point B. If there was no stretching due to deformation of the portion of the plate 10b, then Point B would be 0.5 W directly below Point A. However, this more perpendicular bent-type deformation is not shown in FIG. 3A or 3B.

All other deformations should be within these two extremes. So, when looking from Point A to Point B there may be a bent section and then an arc section or an arc section and then a bent section, or it may be just an arc shape or just completely buckled. Even if the deformation is of a bent-type, and there was no additional resistance to extraction provided by the plate 10, the plate 10 still would provide additional resistance to lateral motion. The type of deformation experienced is important to determining the thickness of the plate 10 to be used, because excessive thickness may lead to difficulty with manual insertion.

When referring to a plate for use in a fabricated body, as shown in FIGS. 4A and 4B, the receiver plate 110 may be designed for enhanced performance with spike-type fasteners. The example of such a plate 110 is shown in a perspective view in FIG. 4A and in a plan view in FIG. 4B, and is configured for use in a fabricated railroad tie. It will be appreciated that a plate 110 ideally will be of any size that would fit within the perimeter of the tie or body in which the plate 110 will be embedded. Thus, while the plate could extend outward from the sides of the body, it is preferred that the plate 110 will not only be sandwiched between layers of material within a fabricated body, but actually will be completely surrounded and protected by the material of the fabricated body.

When a plate 110 is placed in rail tie it will have a nominal first end edge 112, second end edge 114, right side edge 116, and left side edge 118. As illustrated, an example generally planar plate 110 may include apertures of one or more sizes, such as large apertures 122 or small apertures 124. The apertures may be in any of a variety of configurations or placements, both located within the interior of the plate 110 and around the exterior or perimeter of the plate 110, as shown with apertures 126, which actually are half apertures. The apertures 122, 124, 126 allow for a mechanical adhesion as the material within which the plate is embedded flows through the binding apertures and secures the plate 110 in place. Although small exterior binding apertures are shown only on the side edges 116, 118, it will be understood that they also could be located along the first and second end edges 112, 114. The cumulative affect of these apertures is to more securely affix a plate 110 within the material of a fabricated body.

The configuration of the plate 110 in FIGS. 4A and 4B includes slots 132, which are defined by narrow cuts in the plate 110. The slots 132 are shown much wider than expected, for illustrative purposes. Indeed, when referring to "large", "small" and "narrow", these terms are used as a dimension would compare to the relative diameter or cross-section of the expected spike-type fasteners that would be used with the plate 110, such as a rail spike. Thus, a large diameter is one or more times the diameter of the fastener, while a small diameter is less than the diameter of the fastener, and narrow is used in the sense of small, in that it refers to a slot that is no more than the diameter or cross-section of the intended fastener.

The spaced slots 132 form straps 134 of uninterrupted plate material therebetween, with the slots 132 and straps 134 running parallel to each other. Some of the straps 134 are relatively longer, by extending nearly from the first end edge 112 to the second end edge 114, while others are shorter, extending between the large interior apertures 122. A spike-type fastener may be targeted for insertion that will result in an increased extraction force by locating the fastener at any place along the plate with the exception of the large interior mechanical binding apertures 122. As the exact location of the large apertures 122 may not be determinable once the plate 110 has been embedded in the material of the fabricated body, use of fasteners in extreme positions, such as in the areas along the ends of the body, should be avoided if using this type of plate configuration.

One will appreciate that with a more specialized plate configuration, as shown in FIGS. 4A and 4B, a spike-type fastener will transition through the plate 110 in one of several modes, depending on precisely where the spike contacts the plate 110. Advantageously, a specific location need not be determined, as would be required when using a nut as a receiver for a bolt. Instead, the fastener may be placed anywhere within the expansive receiver target area. Thus, a spike-type fastener could happen to be directed through a small interior binding hole 124. In this case the spike-type fastener would be larger than the aperture and enlarging the aperture would effectively increase friction while permitting in-bound passage and resisting extraction, and resisting motion within a two dimensional plane of the plate 110. The material from enlargement would be carried by friction below the plate 110 in the direction of insertion.

Alternatively, a spike-type fastener could happen to be directed through a narrow slot 132. The spike-type fastener would be larger than the slot 132, which is a narrow gap between straps 134. The spike-type fastener would create an aperture either in one strap 134 and in one slot 132, or in one strap 132, spanning a slot 132, and in the next adjacent strap 134. In either case the aperture would be enlarged by the fastener as it is driven through the plate 110. The material from enlargement would be carried by friction to below the plate 110 in the direction of insertion and effectively would increase friction while permitting in-bound passage and resisting extraction. Also, a spike-type fastener could pierce the plate 110 if it happens to be directed at a section of the plate without an aperture 124 or a slot 132. In this case, the fastener would create its own aperture, and then enlarge it as the tip and then the shaft of the fastener passes through the plate 110, effectively increasing friction while permitting passage of the fastener. The plate material from creation of the aperture and subsequent enlargement would be carried by friction to below the plate in the direction of insertion. This would create friction while permitting in-bound passage and resisting extraction of the fastener. In both instances, engagement with the plate 110 also would serve to resist motion within a two dimensional plane of the plate 110.

Figure 5:
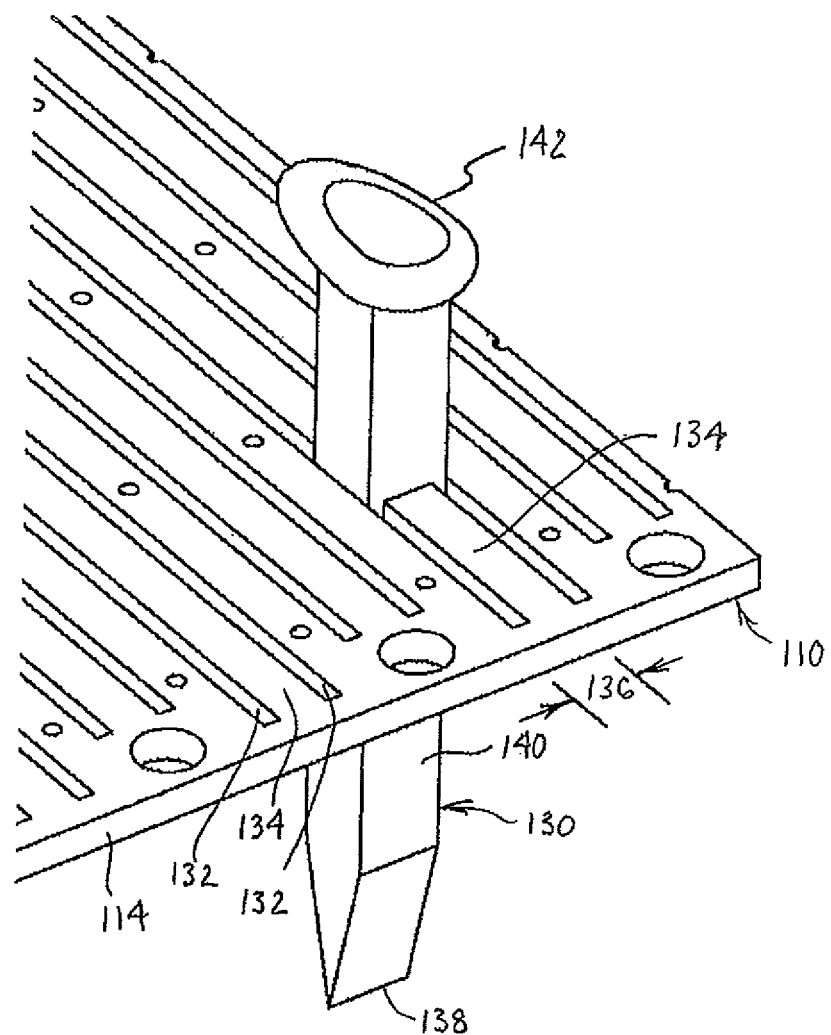
FIG. 5 is a perspective view of a fastener after having passed through the plate shown in FIG. 4A.

Referring to FIG. 5, it is possible that a spike-type fastener 130 would have a tip wider than the slot-to-slot distance measured along the second end edge 114, as indicated by the dimension 136. The cross section of the fastener 130 is immaterial and could be either a large cylindrical spike or a large spike with a chisel-shaped, or other type of tip 138. The transition of such a large fastener would break either a long or short strap 134. In either case, the chisel tip 138 of the fastener 130 then would enlarge that break, as the tip 138 widens the break to the size of the shaft 140 of the chisel tip fastener 130. The plate material from creation of the break and subsequent enlargement would be carried by friction below the plate 110 in the direction of insertion. This creates friction while permitting in-bound passage and resisting fastener extraction. A sufficiently large spike-type fastener 130 could break one strap, partially break two adjacent straps, or completely break two or more adjacent straps. In all of these cases the plate will continue to function as designed and will provide resistance to motion of the fastener 130 within a two dimensional plane of the plate 110.

To extract the fastener 130, force is applied upward on the head 142 of the fastener 130. Resistance to extraction is supplied by friction between the shaft 140 of the fastener 130 and the material of the fabricated body that is in contact with the fastener 130. Further friction is created between the fastener 130 and the plate material that is deformed during insertion, as the deformed material may try to return to its original planar position of the plate 110 as a result of friction between the shaft of the fastener 130 and the plate 110 when attempting to extract the fastener 130.

With respect to resisting lateral motion, if the plate 110 is well and truly secured in the material of the body, then lateral motion created by applying a force to the head 142 of the fastener in a direction parallel to the plane of the plate 110 will result in an attempt to rotate or pivot the fastener about the plate 110, with the plate 110 acting as a fulcrum. Thus, a lateral force applied at the head 142 of the fastener would be resisted by the required movement of both the head 142 and movement in the opposite direction of the tip 138, as the tip 138 must be displaced in an opposite direction of the head 142 of the fastener 130, due to the plate 110 acting as a fulcrum. This is a far more substantial and stable resistance to motion relative to a body not having an embedded plate 110. Without the plate 110, the material of the body would instead be subjected to simple and direct crushing by the fastener shaft 140 in the direction of the lateral force that is being applied to the fastener 130, with substantial lateral movement of the shaft 140 near the fastener head 142 relative to minimal lateral movement near the fastener tip 138. Moreover, the plate 110 can be positioned nearer to the head 142 of the fastener 130 to help provide even greater immediate dissipation of such lateral forces and to reduce any bending in the upper portion of the shaft 140 of the fastener 130.

FIG. 6 illustrates a simplified view of use of a plate, such as the plate 110, in a fabricated railroad tie 120. In this example, the tie would be constructed with the plate 110 placed atop a timber 150, with both then being over-molded in a plastic cover 152. The plastic cover 152 is represented in the form of pieces that are shown in an exploded fashion for ease of viewing the placement of the plate 110, but it will be understood that the plastic would be molded, in a manner that would form a continuous cover 152, as opposed to separate pieces. Thus, the body of this example fabricated tie 120 is constructed of the plate 110 and the timber 150 that are embedded within the plastic 152.

Figure 7A:
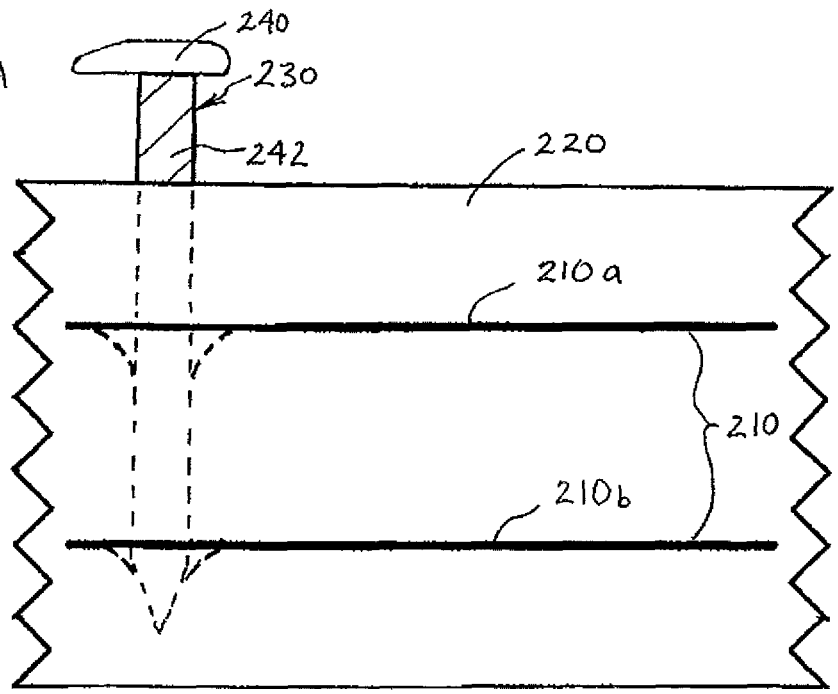
FIG. 7A is a partial cross-sectional view of two plates embedded within a body and with a fastener driven through the plates.
Figure 7B:
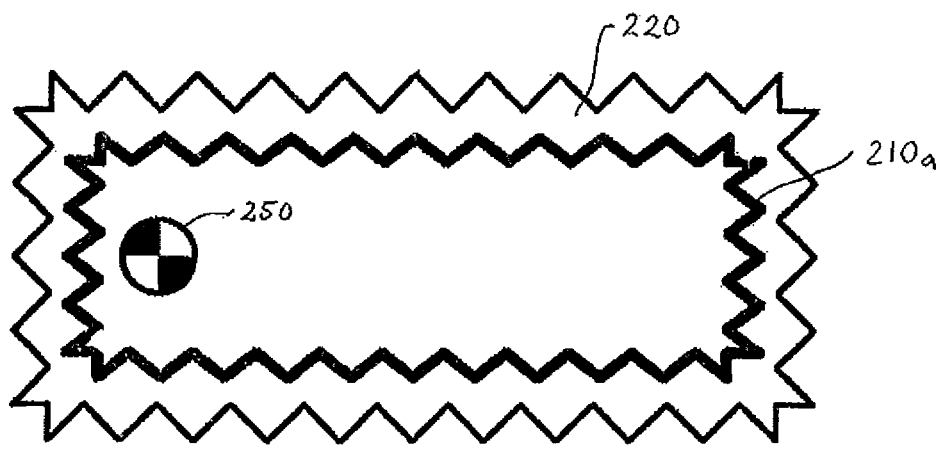
FIG. 7B is a top view of a partial section showing a plate within a fabricated body presenting a general target area for insertion of a fastener.

In the alternative configuration shown in FIGS. 7A and 7B, there are two plates 210 embedded in a body 220. A first upper plate 210*a* and a second lower plate 210*b* are spaced apart. A fastener 230, such as a rail spike, has been driven through the plates 210. A side view of a partial section is shown in FIG. 7A, while a top view of a partial section is shown in FIG. 7B, demonstrating a location 250 for fastener insertion within the relatively large, target area that is provided by the plates 210. For convenience, the portion of the body 220 that is shown in FIG. 7B can be considered to be an upper surface of a timber that is located between the upper and lower plates, in a manner similar to that shown in FIG. 6 where a plate 110 and a timber 150 are embedded within a plastic cover 152. However, it will be appreciated that alternative constructions using different materials and configurations may be implemented. In this example, the use of two receiver plates within a fabricated body 220 provides resistance to motion along all three axes, as previously discussed, but further provides resistance to motion in all six directions because the fastener cannot tend to pivot about engagement with just one plate. Thus, the first upper plate 210*a* would act as a fulcrum, but for the second lower plate 210*b* that acts as an anti-fulcrum.

With respect to insertion force, when utilizing two plates, there will be some added resistance to insertion as the fastener 230 is driven through the material of the body, then through the first upper plate 210*a*, then through material of the body. The first plate 210*a* will deform as the plate material is moved by the fastener 230 further into the material of the body, which may be the same material as is located above the plate, or as with the example shown in FIG. 6, may be a different material. The material of the object 220 between its top planar surface and the first upper plate 210*a* provides resistance to insertion. The first upper plate 210*a* provides additional resistance to insertion. During insertion, the fastener 230 will continue through the material located between the first and second plates 210 and continue through the second lower plate 210*b*. The second lower plate 210*b* deforms as plate material is moved by the fastener 230 into the material of the body 220. The material of the body 220 that is disposed above, between and below the plates, as well as the plates 210, all provide some resistance to insertion.

To extract the fastener 230, force is applied upward on the head 240. Resistance to extraction is supplied by friction between the fastener shaft 242 and the material of the object 220, as well as by friction between the shaft 242 and the plates 210. Further friction is created between the shaft 242 and the material of the first and second plates 210*a*, 210*b* that was deformed during insertion of the fastener 230, as the deformed material of the plates 210 may try to return to its original planar positions within the plates 210*a*, 210*b* as a result of upward movement of the shaft 242 and the friction between the shaft 242 and the plates 210*a*, 210*b*.

In one further alternative to the straight forward spike-type fasteners discussed above, it may be advantageous to utilize a fastener having a grooved shaft that includes reductions from the sides of the shaft, as opposed to projections. Thus, the reductions or grooves could be formed, for example, with arc-shapes, such as half-circles. While some prior art spikes are "thin" in one dimension of the cross section, meaning one cross-section dimension is less than 20% of the other, the grooved fasteners contemplated herein would have a more square shank, with the cross-section dimensions being roughly equally in both directions.

To increase resistance during non-buckling extraction of a fastener, small grooves can be placed on one or opposed sides of the shaft of the fastener. The grooves may be aligned from one side to the other of the fastener, partially offset relative to each other, or fully offset. Also, the grooves may be contiguous, as in immediately repeating, or may be spaced apart from each other, with portions therebetween that are straight or of other shapes. It will be appreciated that a side profile of a shaft having intermittent grooves, with flat portions therebetween, will present a side wall having more material to resist any shear forces presented by engagement with a plate during attempted extraction of the fastener. Moreover, to ensure a robust fastener and a high level of material positioned below each groove to resist such shear forces, it would be preferable to have relatively shallow or small grooves, such as, for example, optionally having a depth of 10% of the thickness of the fastener shaft. In addition, the grooves preferably are rounded in shape, as opposed to being formed in a manner that would create a locus, where energy, such as is generated through vibration, could become focused and promote premature failure.

An example of a grooved fastener 330 is illustrated in FIG. 8. The fastener 330 is in the form of a railroad spike having a head 332, a shaft 334 and a chisel-shaped tip 336. The shaft 334 includes rounded, undercut lateral grooves 338 on a portion of the left side of the shaft 334, which are perpendicular to a longitudinal axis L' of the fastener 330 and are non-contiguous, as they are separated by relatively flat sections 340. The grooves 338 on the left side of the shaft 334 are shown as being aligned with, or not offset from, like lateral grooves 342 on the right side of the shaft 334. It will be appreciated that if a plate having slots and straps is being embedded in an object, such as a railroad tie, for use with the fastener 330, then the lateral grooves 338, 342 could engage the slots, straps, apertures or solid portions of the plate in virtually any manner and they would engage portions of the plate that would provided increased resistance to extraction.

A further example of a grooved fastener 430 is illustrated in FIG. 9. The fastener 430 is of similar form to that of the fastener 330, having a head 432 and chisel-shaped tip 436, but having lateral grooves 438, 442, relatively flat sections 440, and including longitudinal grooves 444 down the sides of the shaft 434 of the fastener 430 that do not include lateral grooves and that run parallel to the longitudinal axis L" of the fastener 430. While the longitudinal grooves 444 are shown as being continuous and of a length that is almost as long as the length of the fastener 430, the longitudinal grooves need not be continuous and could be in the form of two or more spaced apart grooves. The lateral grooves 438, 442 and/or longitudinal grooves 444 may be used to hold and deliver substances that prevent, or retard, rot or other environmentally based degradation.

In the example in FIG. 6, an inner timber core 150 is encased in an outer plastic casing 152, and when a spike-type fastener breaks through the plastic outer casing 152, the seal that prevents potential wet and dry cycles that can lead to rot is breached. In this condition, the example timber core 150 may be susceptible to intrusion of liquids and bacteria that can promote deterioration. However, prior to insertion, some of the lateral grooves 338, 342 of the fasteners 330, or some of the lateral grooves 438, 442 and/or longitudinal grooves 444 of the fasteners 430, may receive a single variety or multiple varieties of solid, semi-solid or liquid materials that resist rotting, which are sometimes referred to as a biocide. The substances are used to eradicate the agents that initiate and perpetuate timber deterioration, and can be placed directly in the proximity of where the substances would be needed, as opposed to requiring the entire timber inner core to be treated. The grooves also may carry other beneficial substances, such as sealants, to prevent further intrusion of liquids. This may be particularly effective when a fastener 330, 430 is being used with a preexisting hole, such as when replacing a previously installed fastener.

Use of lateral or longitudinal grooves on the fasteners 330, 430 is advantageous because they allow the fasteners to be preloaded with substances, so that no additional steps are needed for application of the substances. Eliminating the need to treat an entire inner timber core 150 also is advantageous because it permits a major savings of biocide or other substances by permitting them to be applied directly where needed, as opposed to wasting large quantities to treat areas that may not otherwise need to be treated. Reduced use of biocide and other substances also lessens the potential for run off of such substances during use and disposal. It will be appreciated that, while longitudinal grooves may be placed on sides of the fastener not having lateral grooves, they also may be used on sides that do have lateral grooves, whether being located above, below or on intermittent surfaces not having lateral grooves, or being used in combination with and running directly through portions that also have lateral grooves.

It will be appreciated that a receiver in the form of a plate to be embedded in a fabricated body for engagement by fasteners, in accordance with the present disclosure, may be provided in various forms. Any variety of suitable materials of construction, configurations, shapes and sizes for the plate and fasteners and features thereof, as well as methods of manufacturing and using such components, may be used to meet the particular needs and requirements of an end user. It will be apparent to those skilled in the art that various modifications can be made in the design and construction of such components without departing from the scope of any claims that may issue from this patent application and such claims will not be limited to the embodiments shown herein.

What is claimed is:

1. A receiver plate embedded within a fastener target area of a fabricated body, the receiver plate comprising a plate generally extending within a single plane, the receiver plate having apertures and being positioned within the fabricated body, wherein the receiver plate is surrounded by a material of the fabricated body with the material of the fabricated body providing enhanced mechanical bonding within the fabricated body where the material extends through the apertures of the receiver plate, wherein the apertures further comprise a plurality of parallel, elongated continuous slots having a greater length than width, the slots extending substantially across a planar dimension of the receiver plate, and defining between them a plurality of continuous elongated straps having a greater length than width, each elongated strap defined in the space between a pair of adjacent elongated slots, wherein when a fastener is inserted into the fabricated body and through the receiver plate at an imprecisely determined location within the fastener target area at least one portion of one or more straps fractures and the at least one portion of the one or more straps deforms in a direction of insertion of the fastener and to remains engaged with the fastener at a location spaced from the single plane, and the receiver plate provides tri-axial motion resistance for the fastener.

2. The receiver plate embedded within the fabricated body of claim 1, wherein the fabricated body further comprises a section of wallboard.

3. The receiver plate embedded within the fabricated body of claim 1, further comprising a timber embedded within the fabricated body.

4. The receiver plate embedded within the fabricated body of claim 1, wherein the fabricated body further comprises a railroad tie.

5. The receiver plate embedded within the fabricated body of claim 1, further comprising at least a second receiver plate, wherein the receiver plates are embedded within the fabricated body in one or more target areas.

6. The at least two receiver plates embedded within the fabricated body of claim 5, wherein the at least two receiver plates are parallel and spaced apart from each other in the direction of insertion of a fastener that when inserted passes through the at least two receiver plates, and each receiver plate generally extends within a single plane and further comprises apertures, with each receiver plate being surrounded by the material of the fabricated body, with the material of the fabricated body providing enhanced mechanical bonding within the fabricated body where the material extends through the apertures of the respective receiver plates.

7. A fabricated body adapted for insertion of fasteners within a target area comprising:
a molded body portion and a receiver plate embedded within the molded body portion in a target area, the receiver plate further comprising a plate generally extending within a single plane, the receiver plate having apertures and being positioned within the molded body portion, wherein the receiver plate is surrounded by a material of the molded body portion with the material of the molded body portion providing enhanced mechanical bonding within the fabricated body where the material extends through the apertures of the receiver plate, wherein the apertures further comprise a plurality of parallel, elongated continuous slots having a greater length than width, the slots extending substantially across a planar dimension of the receiver plate, and defining between them a plurality of continuous elongated straps having a greater length than width, each elongated strap defined in the space between a pair of adjacent elongated slots, wherein when a fastener is inserted into the fabricated body and through the receiver plate at an imprecisely determined location within the target area at least one portion of one or more straps fractures and the at least one portion of the one or more straps deforms in a direction of insertion of the fastener and remains engaged with the fastener at a location spaced from the single plane, and the receiver plate provides tri-axial motion resistance for the fastener.

8. The fabricated body of claim 7, wherein the molded body further comprises a section of wallboard.

9. The fabricated body of claim 7, further comprising a timber embedded within the molded body portion.

10. The fabricated body of claim 7, wherein the molded body further comprises a railroad tie.

11. The fabricated body of claim 10, further comprising a timber embedded within the molded body portion.

12. The fabricated body of claim 7, further comprising a plurality of receiver plates embedded within the molded body portion in one or more target areas.

13. The fabricated body of claim 12, wherein the plurality of receiver plates are parallel and spaced apart from each other.

14. The receiver plate embedded within the fabricated body of claim 1, further in combination with a fastener that is inserted into the fabricated body and through the receiver plate, wherein the fastener has a head, a shaft and a tapered tip.

15. The receiver plate embedded within the fabricated body and further in combination with the fastener of claim 14, wherein the tapered tip of the fastener is chisel-shaped.

16. The receiver plate embedded within the fabricated body and further in combination with the fastener of claim 15 wherein the fastener is a railroad tie spike.

17. The receiver plate embedded within the fabricated body and further in combination with the fastener of claim 14, wherein the tapered tip of the fastener is pointed.

18. The receiver plate embedded within the fabricated body and further in combination with the fastener of claim 14, wherein the fastener further comprises a straight shaft.

19. The receiver plate embedded within the fabricated body and further in combination with the fastener of claim 14, wherein the fastener further comprises a threaded shaft.

20. The receiver plate embedded within the fabricated body and further in combination with the fastener of claim 19, wherein the fastener is a self-tapping screw.

21. The receiver plate embedded within the fabricated body and further in combination with the fastener of claim 14, wherein the shaft of the fastener further comprises at least one lateral groove relative to a longitudinal axis of the shaft and wherein when the fastener is inserted into the fabricated body and through the receiver plate the lateral groove is engaged with the portion of the strap that is deformed in the direction of insertion of the fastener and at a location spaced from the single plane and in the direction of insertion of the fastener.

22. The receiver plate embedded within the fabricated body and further in combination with the fastener of claim 14, wherein the fastener further comprises at least one lateral or longitudinal groove in the shaft relative to a longitudinal axis of the shaft, wherein the at least one groove holds a single variety or multiple varieties of solid, semi-solid or liquid substances, wherein when the fastener is inserted into the fabricated body and through the receiver plate and there is fluid intrusion into the fabricated body and on the shaft of the fastener the single or variety of substances resist rotting or degradation of the body at locations along the shaft and within the fabricated body.

23. The receiver plate embedded within the fabricated body and further in combination with the fastener of claim 21, wherein the shaft of the fastener further comprises at least two lateral grooves spaced apart relative to a longitudinal axis of the shaft and wherein when the fastener is inserted into the fabricated body and through the receiver plate at least one of the at least two lateral grooves engages the receiver plate at a location spaced from the single plane and in the direction of insertion of the fastener.

24. The receiver plate embedded within the fabricated body and further in combination with the fastener of claim 21, wherein the shaft of the fastener further comprises at least two lateral grooves positioned on opposed sides of the shaft.

\* \* \* \* \*